A. MENTZER.
DEMOUNTABLE RIM.
APPLICATION FILED JAN. 8, 1918.

1,283,853.

Patented Nov. 5, 1918.

Inventor
Allen Mentzer.
By Geo. Stevens
Attorney

UNITED STATES PATENT OFFICE.

ALLEN MENTZER, OF DULUTH, MINNESOTA.

DEMOUNTABLE RIM.

1,283,853.

Specification of Letters Patent. Patented Nov. 5, 1918.

Application filed January 8, 1918. Serial No. 210,830.

*To all whom it may concern:*

Be it known that I, ALLEN MENTZER, a citizen of the United States, residing at Duluth, in the county of St. Louis and State of Minnesota, have invented certain new and useful Improvements in Demountable Rims, of which the following is a specification, reference being had therein to the accompanying drawing.

This invention relates to demountable rims for vehicle wheels, the primary object of the novel combination of parts being to improve the adaptability of the rim.

Another object is to make a jointed rim of this character which cannot become wholly disconnected after being once assembled.

Other objects and advantages of the novel construction will appear in the further description of the invention.

Referring to the accompanying drawing forming part of this application and in which like reference characters indicate like parts, Figure 1 is a side elevation of one of the improved rims with a tire mounted thereupon.

Figures 1, 2:
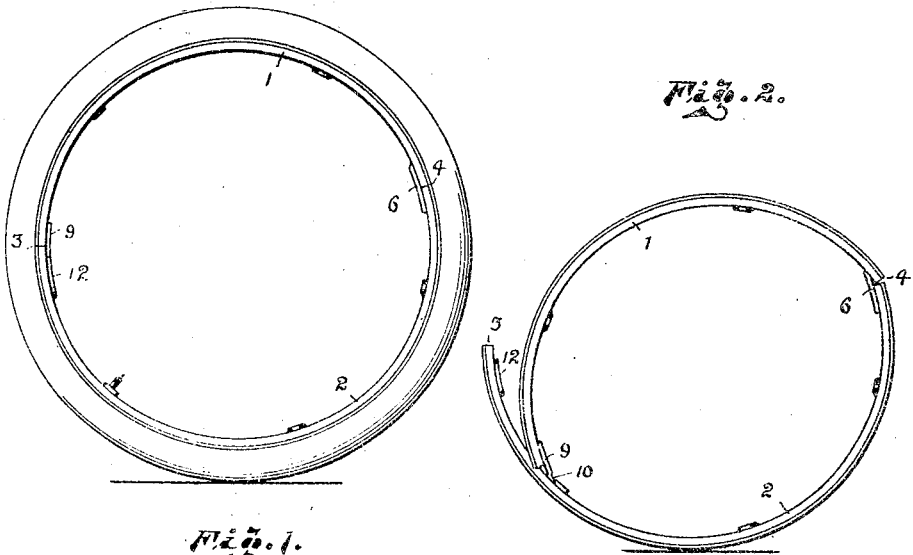
Fig. 2 is a similar view of the rim as it appears folded ready for the reception or removal of a tire.
Figure 3:
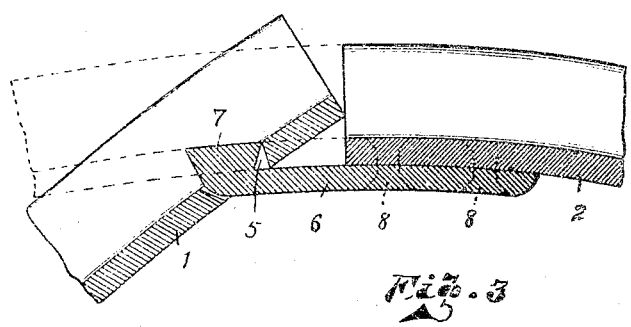
Fig. 3 is an enlarged sectional view of the hinged ends of the two parts of the rim.
Figure 4:
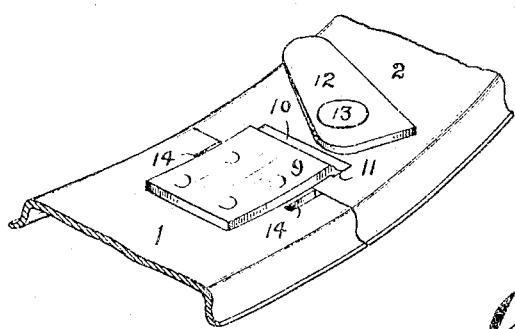
Fig. 4 is a perspective view of the opposite abutting ends of the two parts of the rim.

The rim is composed of two unequal arcuately shaped sections which, when properly united with their coöperating ends abutting, form a complete circular rim. In transverse contour the rim may be of any ordinary form which is usually approximately U-shaped for the purpose of securely holding the tire casing therein.

In practice I prefer to make the two sections of the rim but slightly different in length say for example in the ordinary automobile wheel the section 1 would be from four to six inches shorter than the section 2. At the joints of separation indicated at 3 and 4 the sections are cut squarely off and abut each other when assembled to form the complete circle of the rim.

The two sections are hinged together at the point 4 by there being a transversely elongated rectangular shaped opening 5 formed in the base of the rim of one of the sections adjacent the end thereof, the edges of which hole parallel with the axis of the rim are inclined, and diverge outwardly from the center of the rim. From the outer face of the rim is placed into the hole 5, a lug or dog 6 having a flaring head 7 formed at right angles to the body portion and which just fills the hole 5 snugly when therein but which can not under any circumstances be drawn through the hole inwardly. After this lug is placed body first, into the hole 5 it is brought up against the inner face of the abutting end of the other section and securely fixed thereto by suitable rivets 8. I have shown the lug as being fastened to the longer section 2, and the slot 5 is in the section 1, but this order may be reversed if desired.

The opposite ends are made to be united and locked in a manner common in the art, which consists in having a projecting lug 9 fixed to one of the ends, said lug having a lip 10 upon its free end which fits into a slot 11 formed in the other end of the rim. When this lip is in place in the slot in the abutting end of the rim it is held locked therein by the overlapping lever 12 pivoted at 13 to the base of the rim adjacent the slot 11 and which may be turned to lock or unlock the engaging portions of the rim.

I have shown in one of the abutting ends of the rim a pair of elongated notches 14 which are for the reception of a tool such as a screw driver or end of a file for prying the ends of the rim either together or apart as desired.

By the manner as above described of permanently hinging together the two sections of the rim they can not become accidentally separated from each other and when the free end of the smaller section is slipped down inside of the free end of the larger section the pivotal point of the hinged ends of the sections is seen to be a considerable distance back from the point of separation of the sections.

This together with the fact that that portion of the lug 6 extending beyond the end of the section to which it is fixed will slip outwardly through the hole 5 will shorten the radial throw of the shorter section in respect to the longer section and thus allow the free end of the shorter section greater extent of freedom within the longer section. As is evident this materially increases the adaptability of the rim to a tire and casing and results in a combination possible of manipulation with much less labor than in somewhat similar types of rims heretofore known.

I am aware that rims of this nature have been divided into two sections somewhat as shown, but not with the novel form of hinge herein disclosed and claimed and therefore have not proven wholly satisfactory.

Having thus described my invention what I claim as new and desire to secure by Letters Patent is—

1. The combination with a demountable rim divided into two sections and having means for locking the free ends of the sections together, of a hinge permanently uniting the opposite ends of the sections said hinge comprising a hole through one section adjacent the end thereof and a lug securely fastened to and extending beyond the end of the other section and non-detachably held within the hole in the other section.

2. The combination with a demountable rim divided into two unequal arcuate sections and having means for holding the free ends of the sections normally abutting each other of a hinge uniting the opposite ends of the sections said hinge comprising a hole through the end of the shorter section and spaced a distance therefrom, a lug rigidly fixed to the adjacent end of the longer section and coöperatively engaging the hole.

3. The combination with a demountable rim divided into two sections and having means for holding the free ends of the sections normally abutting each other, of a hinge uniting the opposite ends of the sections comprising a hole through the end of one section having inclined side walls diverging outwardly and a lug fastened to the end of the other section, projecting therefrom and having an enlarged dovetailed extremity coöperatively engageable within the hole in the other section substantially as and for the purpose described.

In testimony whereof I hereunto affix my signature in the presence of two witnesses.

ALLEN MENTZER.

Witnesses:
W. H. DENHAM,
S. GEO. STEVENS.